April 3, 1962    J. P. RAIBAUD    3,027,843
PISTON PUMPS, IN PARTICULAR FOR FEEDING FUEL
TO INTERNAL COMBUSTION ENGINES
Filed Dec. 19, 1956    5 Sheets-Sheet 1
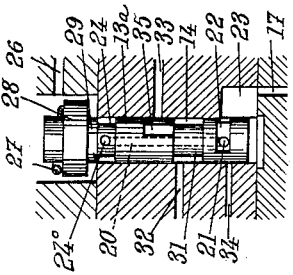
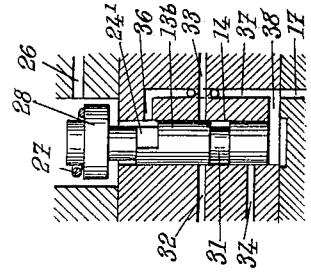
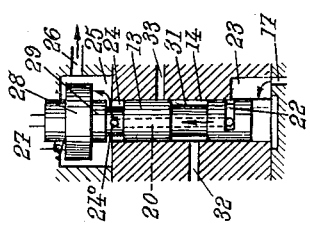
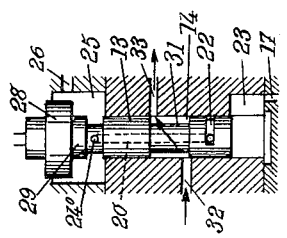
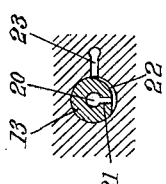
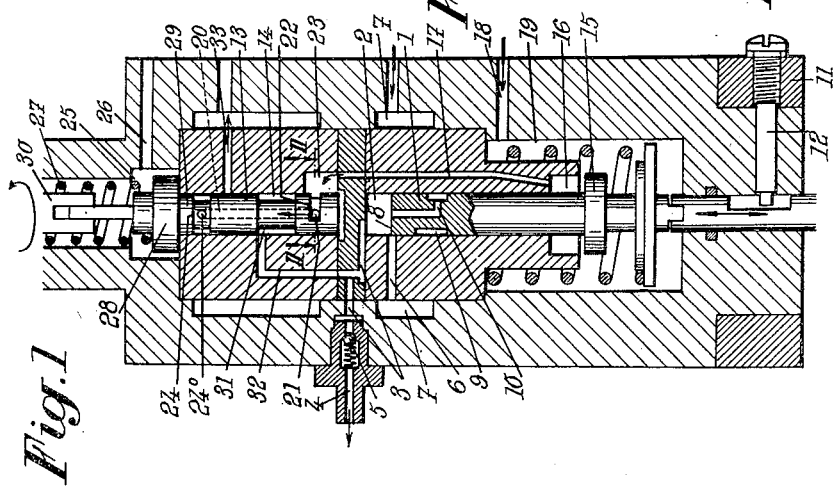

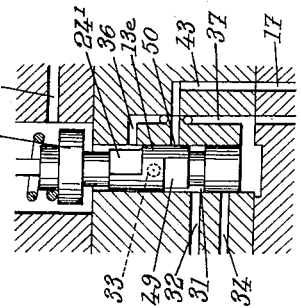
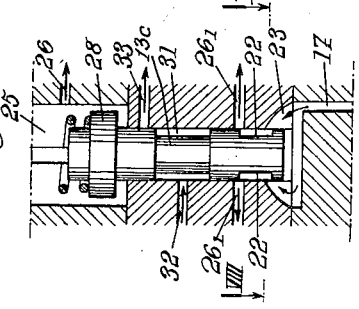
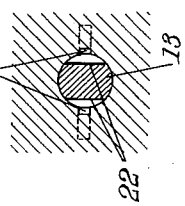
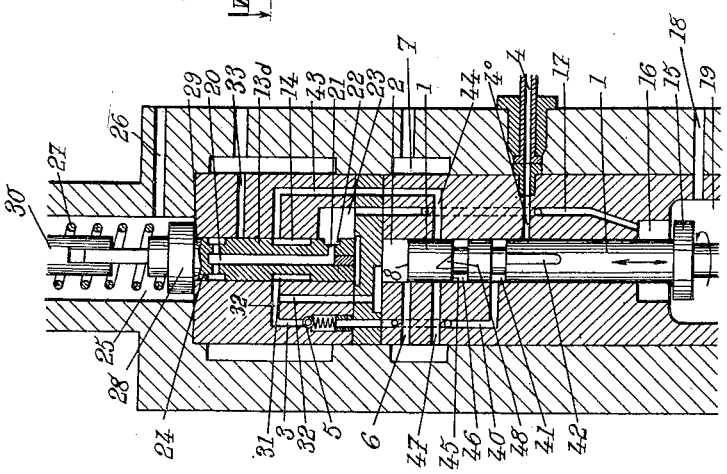

April 3, 1962 J. P. RAIBAUD 3,027,843
PISTON PUMPS, IN PARTICULAR FOR FEEDING FUEL
TO INTERNAL COMBUSTION ENGINES
Filed Dec. 19, 1956 5 Sheets-Sheet 3

April 3, 1962     J. P. RAIBAUD     3,027,843
PISTON PUMPS, IN PARTICULAR FOR FEEDING FUEL TO INTERNAL COMBUSTION ENGINES
Filed Dec. 19, 1956     5 Sheets-Sheet 4
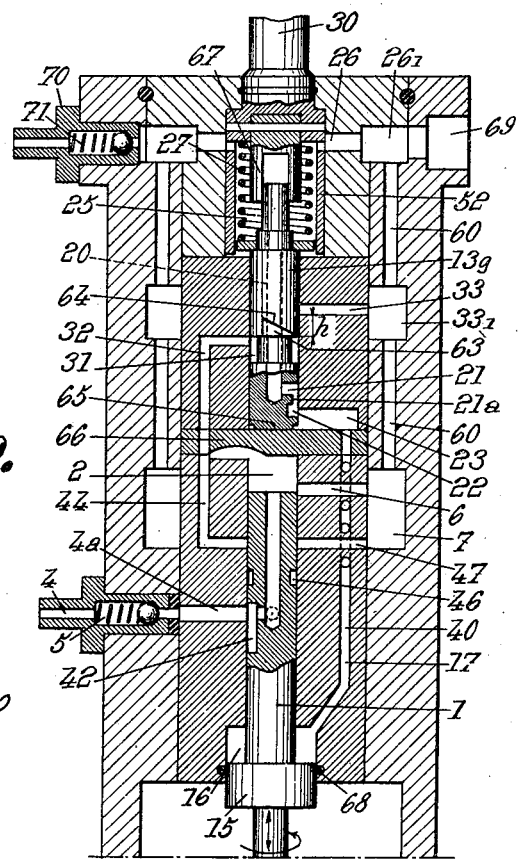
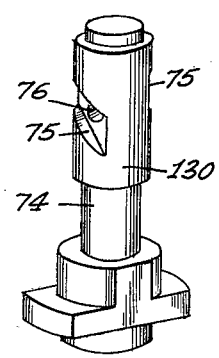
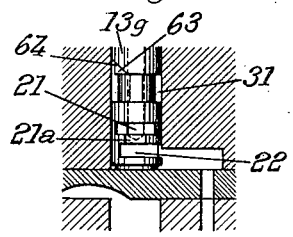

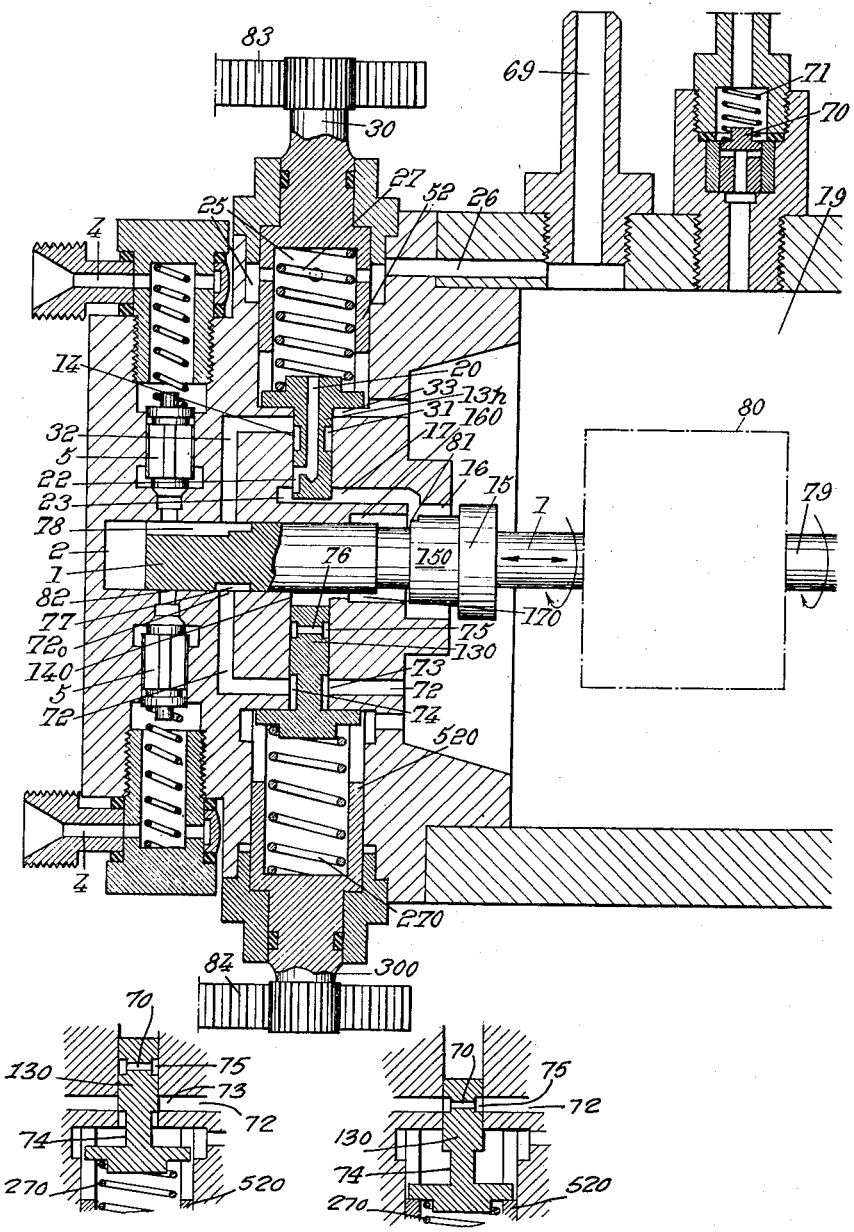

United States Patent Office 3,027,843
Patented Apr. 3, 1962

3,027,843
PISTON PUMPS, IN PARTICULAR FOR FEEDING FUEL TO INTERNAL COMBUSTION ENGINES
Jean Pierre Raibaud, Le Kremlin-Bicetre, France, assignor to La Precision Mecanique, Paris, France, a society of France
Filed Dec. 19, 1956, Ser. No. 629,269
Claims priority, application France Dec. 23, 1955
14 Claims. (Cl. 103—41)

The present invention relates to piston pumps for liquids and in particular to pumps for feeding fuel to internal combustion engines.

Such pumps generally include means for adjustment of their delivery, which adjustment may take place in two different ways, either separately or simultaneously.

One adjustment is concerned with the amount of fuel driven by the piston on every stroke thereof. This adjustment is suitable to adapt the injection to the maximum torque that is required. Another adjustment is concerned with the amount of fuel effectively delivered to the injectors, or other equivalent apparatus, in accordance with the resistant torque. Preferably this second adjustment should take place automatically in accordance with the variations of the speed, that is to say in such manner as to reduce the amount of fuel fed to the engine, possibly to zero, when the speed exceeds a predetermined value, the whole being arranged in such manner that this value can be fixed at will (for instance by means of a pedal or lever).

It is known, in particular for the second of these adjustments, to make use of a regulating slide-valve through which passes the liquid to be delivered and which is subjected, under the effect of the operation of the pump, to a hydrodynamic pressure which increases when the speed increases and which tends to lift said slide-valve as soon as said speed has reached a predetermined value. This hydrodynamic pressure variable with the speed is due to the action of a throttled portion provided for the passage of the liquid flowing through said slide-valve. When the slide-valve moves up as a consequence of the fact that this critical speed has been exceeded, it exerts an action tending to reduce the amount of fuel effectively delivered to the corresponding injector on every piston stroke. This reduction is due for instance either to a suction exerted by the slide-valve when it is returning to its initial position as a consequence of the return movement of the main piston to its lowermost position, or to a short-circuiting effect through an orifice cleared by the displacement of the slide-valve.

The above mentioned throttled portion is made adjustable for instance in response to the rotation of the slide-valve about its axis, which permits of fixing at will the speed that is chosen for this regulation effect.

An essential feature of this known arrangement is therefore that the liquid to be delivered is compelled to flow through the regulating slide-valve. Now, it has been found that such an arrangement, although having substantial advantages, also involves some drawbacks. In particular, the characteristics of slide-valves of this kind depend too much upon the rate of flow of the liquid passing therethrough, that is to say upon the power of the engine with which they are to cooperate. Therefore it is necessary to provide a great number of types of regulating slide-valves corresponding to the various flow rates to be obtained.

The present invention is based upon the use, in order either to determine or to adjust the delivery (both for metering the amount of liquid displaced by the piston and for adjusting the true delivery in accordance with the value of the speed), of regulating slide-valves movable by the pressure of a liquid discharged in synchronism with the displacements of the main piston, and it is characterized in that the circuit through which this liquid is made to flow is distinct from the delivery circuit leading to the injectors or like apparatus.

When it is desired to obtain a metering of the delivery, the corresponding slide-valve is for instance mounted on a conduit for the flow of the liquid toward or from the main cylinder, said slide-valve having its displacements hydraulically connected with those of the main piston but independently of the delivery circuit and including means capable, under the effect of said displacements, of controlling the flow of the liquid toward or from said cylinder at the desired times.

When it is desired to adjust the delivery in accordance with the speed of the engine, the corresponding slide-valve may be of a type including a variably throttled portion, as above referred to, and it acts in a suitable manner, by its movement (started when the speed increases above a given value), to reduce, possibly to zero, the amount of fuel effectively delivered to the injector or the like on every piston stroke.

Preferred embodiments of the present invention will be hereinafter described with reference to the accompanying drawings, given merely by way of example and in which:

FIG. 1 is a diagrammatic axial sectional view of a fuel injection pump for an internal combustion engine, made according to the invention.

FIG. 2 is a sectional view on the line II—II of FIG. 1.

FIGS. 3 and 4 are partial views showing, similarly to FIG. 1, the speed regulation slide-valve of said pump, in two different working positions respectively.

FIGS. 5 and 6 are axial sectional views of regulating slide-valves of the same type, but made according to modifications.

FIGS. 7 and 8 show, respectively in axial sectional view and in cross sectional view on the line VIII—VIII of FIG. 7, a slide-valve of the same type made according to still another modification.

FIG. 9 is an axial sectional view showing, similarly to FIG. 1, a pump made according to another embodiment of the invention.

FIG. 10 shows a speed regulation slide-valve made according to a modification.

FIGS. 15 and 16 show, similarly to FIGS. 11 and 12, a pump made according to a modification of the embodiment of these last mentioned figures.

FIG. 17 is a diagrammatic sectional view of a pump made according to still another embodiment of the invention.

Figure 11:
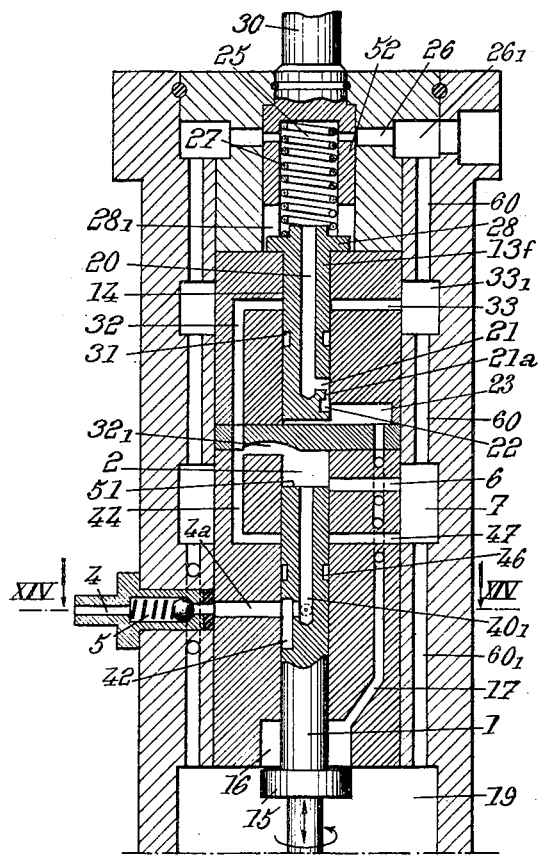
FIGS. 11 to 14 are respectively a partial axial sectional view, an elevational view with parts in section, showing separately some elements of FIG. 11, a cross-sectional view on the line XIII—XIII of FIG. 12 and a cross-sectional view on the line XIV—XIV of FIG. 11, of an injection pump made according to another embodiment of the invention.
Figure 12:
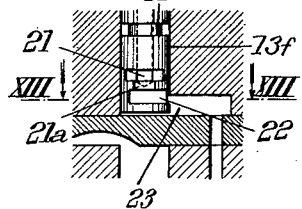
Figure 13:
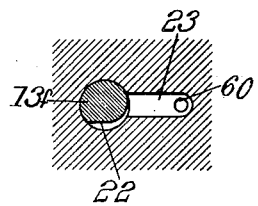
Figure 14:
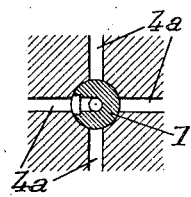

FIGS. 18 and 19 separately show the metering slide-valve in longitudinal section, in two respective positions different from that of FIG. 17.

FIG. 20 is a perspective view of the same slide-valve.

In the following description I will first consider, with reference to FIGS. 1 to 10, the case of a pump having a speed variation responsive regulating slide-valve (adjustment of the amount of fuel driven by the piston on every stroke thereof being obtained through means of any suitable type, possibly such as hereinafter described with reference to FIGS. 17 to 20).

FIG. 1 shows a pump (or a pump element) supposed, for the sake of simplification, to be intended to feed a single injector. This pump essentially includes a piston 1 movable in a pump body C forming a cylinder for said piston, which drives liquid from a delivery chamber 2 of said cylinder to the corresponding injector through a delivery circuit including conduits 3 and 4, with the interposition of a check valve 5.

In the absence of a regulating slide-valve, the beginning and the end of the delivery stroke are determined by suitable means cooperating with at least one conduit 6 in communication with the fuel feed chamber 7. These means include for instance a surface 8 constituted by the top end face of piston 1 and a side groove 9 having an oblique edge, which communicates with surface 8 through an inner conduit 10, the whole working in a manner well known in the art.

The amount of fuel delivered on every piston stroke may be adjusted in this case (to adjust the power supplied by the engine) by giving said piston the desired angular position about its axis, so as to adjust the relative positions of the above mentioned oblique edge with respect to conduit 6. This angular adjustment is obtained for instance by means of a ring 11 which, when rotated, imparts its rotation to said piston through a member such as 12. This member consists for instance of a screw which, once tightened, holds ring 11 and therefore piston 1 in the desired angular position.

A slide valve 13 is combined with this structure to insure regulation of the fuel delivery thereof in accordance with the speed at which the pump is being operated. This slide valve is constituted by a substantially cylindrical part mounted in a cylindrical housing or bore 14 formed in pump body C and separate from the delivery chamber 2. This slide-valve 13 is subjected to the action of a liquid circulating through a regulating circuit wholly distinct and separate from that constituted by chamber 2 and delivery circuit 3—4. To obtain such an action of a liquid circulating through this regulating circuit, I provide a shoulder 15 on piston 1 to act as a plunger piston cooperating with an auxiliary cylinder chamber 16. This chamber 16 is connected with the bottom of a cylindrical bore 14 through a conduit such as 17. The liquid delivered by said piston 15 (this liquid being fed for instance at 18 into an auxiliary feed chamber 19) may be the same as that delivered by the main piston or it may be different.

The circuit through which the liquid delivered by the auxiliary plunger 15 is made to flow includes a throttled portion so as to produce across it a pressure drop which increases when the rate of delivery increases. For instance, such an arrangement may be made as set forth in the British Patent No. 669,762, of April 12, 1949, in the name of "La Precision Mechanique" (in the case, which is not the only possible one, where the section of the throttled portion is adjusted by an angular rotation imparted to the slide-valve).

Finally, I combine with said slide-valve means for enabling it to control, in accordance with the amplitude of its stroke, the amount of fuel effectively delivered on every piston stroke from chamber 2 to conduit 3, in such manner as to reduce this amount when the speed increases.

In the embodiment illustrated by FIGS. 1 and 2, the throttled portion provided in slide-valve 13 is made as follows:

Said slide-valve is provided with an inner conduit 20 the bottom end of which (i.e. that close to conduit 17) forms an orifice 21. This orifice 21 opens into the bottom of a groove 22 of non-uniform depth as shown by FIG. 2. This groove cooperates with a recess 23 formed on one side of the cylindrical housing 13 and into which opens conduit 17 so that the cross section of the passage through which the liquid flows from recess 23 into conduit 20 is varied when the slide-valve 13 is rotated about its axis.

Thus the liquid delivered through conduit 17 flows through said groove 22 and orifice 21 into conduit 20 which opens at 24° into a groove 24, from which it escapes into a chamber 25 provided with a conduit 26 for returning of the liquid to chamber 19.

Slide-valve 13 is subjected to the opposing action of a spring 27 and it is advantageously fitted with a shoulder 28 forming a closure element, the part of slide-valve 13 adjacent to said shoulder 28 forming at 29 a cylindrical portion adapted to fit in the cylindrical housing 14. With such an arrangement, the liquid delivered through conduit 17 must first bring the slide-valve 13 into an intermediate position as shown by FIG. 3 in which it has been lifted a distance slightly greater than the length of said portion 29, so as to allow the liquid to flow into chamber 25.

The adjustment of slide-valve 13 about its axis in order to determine the cross-section of the throttled portion, which in turn determines the speed at which regulation takes place, is obtained through any suitable means such as shown at 30 on FIG. 1, for instance operable from the throttle pedal or any suitable control member.

In order to enable slide-valve 13 to control the amount of fuel effectively fed to injector 4, said slide-valve 13 is provided with an annular groove 31 capable, when said slide-valve has been moved a sufficient distance under the effect of an increase of speed, of connecting together the delivery conduit 3 (or a conduit 32 connected therewith) with a discharge conduit such as 33 which leads back to the feed tank or to a chamber connected with said tank.

This pump works in the following manner.

Under the effect of the movement of the main piston, the differential piston 15 delivers liquid from chamber 16 through conduit 17 toward recess 23, then through the throttled portion 22, 21 and conduit 20. This exerts a hydrodynamic pressure on slide-valve 13, tending to move it upwardly into the position of FIG. 3 where it permits liquid to flow out through 25, 26.

At low speeds, the hydrodynamic pressure is too low to move slide-valve 13 higher up. Therefore said slide-valve has no regulating action and the whole of the fuel driven by the main piston 1 flows to the injector through conduit 4 until the top edge of groove 9 reaches passage 6 and causes the liquid to flow back through 10, 9 and 6 to feed chamber 7.

The above mentioned hydrodynamic pressure increases with the speed and when the speed at which regulation is to take place is reached, this pressure becomes sufficient to produce a supplementary upward movement of slide-valve 13, bringing it into the position of FIG. 4 where groove 31 connects conduit 32 with discharge conduit 33. The fuel delivered by piston 1 is then evacuated, at least partly, toward said discharge conduit 33, instead of being fed to the injector. Therefore the desired regulation action is produced.

It is pointed out that the speed at which regulation takes place may be modified at will by acting at 30 upon the angular position of slide-valve 13, and therefore upon the cross-section of the throttled portion 22. When this cross-section is modified, the law of variation of the hydrodynamic pressure as a function of the speed is varied, and therefore the law of variation of the upward movement of the slide-valve is also varied.

This operation of the slide-valve is characterized by the fact that the injection circuit (2, 3, 4) is distinct and separate from the regulating circuit (15, 16, 17). Due to the fact that slide-valve 13 includes a throttled passage its upward movement varies with the speed, and this independently of the amount of fuel driven by the main piston, since the fuel driven by the main piston does not pass through slide-valve 13, as was the case in prior constructions.

It should be noted that a slide-valve as above described may perform other functions, in combination with that already described. FIGS. 5 to 10 give examples of such modifications.

In the construction illustrated by FIG. 5, a slide-valve 13a such as above described is made to cooperate with a safety conduit which is intended to connect the regulating circuit with the outside when the throttled portion (21, 22) of the slide-valve is closed at the end of the rotation movement thereof.

Such a discharge conduit is visible at 34 on FIG. 5.

According to another feature of my invention, also illustrated by FIG. 5, I provide slide-valve 13a with means capable of enabling it, for one of its angular positions, to keep the delivery end of the pump constantly in communication with the discharge conduit, this position being in particular that corresponding to the stopping of the engine or being a safety position which prevents the possibility of the engine turning at too high a speed when the slide-valve is rotated.

For this purpose, as shown by FIG. 5, I provide above groove 31, a flat part or a longitudinal groove 35 which, when it is located opposite the outlet of conduit 33, affords communication between conduits 32 and 33, even for the lowermost position of the slide-valve.

According to another feature of the present invention, the variably throttled portion is formed, not at the bottom of the slide-valve 13b, but at the other end, that is to say under the top part 28. Said throttled portion is for instance constituted, in the construction illustrated by FIG. 6, by a groove 24' of non-uniform cross-section, same as the groove 22 of FIGS. 1 to 5, cooperating with the outlet 36 of a conduit 37 connected with the lower end 38 of housing 14. In this case there is no inner conduit such as that shown at 20 on FIGS. 1 to 5.

According to another feature of my invention which is also illustrated by FIG. 6, groove 31 is in communication with the outlet of conduit 32 only for the regulation positions, said outlet being for instance at the same level as that of conduit 33. Thus, liquidtightness during normal period operation is considerably improved, since the outlets of the two above mentioned conduits are then both stopped by the solid portion of the slide-valve.

According to another modification, the throttled portion of the regulating circuit is provided at the bottom of the slide-valve 13c and cooperates with at least one return conduit $26_1$ located at a small distance above the distributing recess 23, as shown on FIGS. 7 and 8, this conduit $26_1$ leading back to the liquid tank, as this was the case in the preceding embodiments for conduit 26.

Advantageously, as shown by FIGS. 7 and 8, there may be a plurality of such passages 22 or the like.

In this case also, when the slide-valve reaches a predetermined height under the effect of an increase of speed and of the hydrodynamic pressures that result therefrom, fuel under pressure flows through 32, 31, 33 instead of being fed to the injector.

According to a modification of my invention, the means for stopping the delivery of fuel by the main piston 1, instead of causing the fuel to be fed back through the head of piston 1, make use of a return circuit extending through the slide-valve.

Such an arrangement is shown on FIG. 9. This figure relates to the case of a pump having a single piston which, in addition to its reciprocating motion, has a rotating movement so as to feed fuel successively to the respective injectors of a multicylinder engine. However the feature which is illustrated by FIG. 9 might apply to the case of a pump of the kind of that of FIG. 1.

In the construction of FIG. 9 piston 1, which is both reciprocating and rotating, discharges liquid through conduits 32, 3 and 40, to an annular groove 41 of piston 1. Said piston is provided with a longitudinal flat portion 42 which successively connects said groove 41 with the injectors of the respective engine cylinders through ducts $4_0$ and conduits 4 disposed radially around the pump.

The end of injection on every piston stroke, when the slide-valve 13d does not exert its regulating action, is due to the fact that conduit 32 is connected, through the annular groove 31 of the slide-valve, with a return conduit 43 which leads to a passage 44 in the main cylinder, said passage cooperating with the edge 45 of a groove 46 of piston 1, and with a discharge conduit 47 located for instance at the same level as 44.

As a matter of fact, the number of passages 44 is equal to the number of injectors, and said passages cooperate with oblique distributing surfaces such as diagrammatically shown at 48, to permit, by a suitable adjustment of the angular offsetting between said oblique surfaces and said passages, of determining the amount of fuel fed on every piston stroke.

The arrangement of FIG. 9 may be modified by making use of a suitable slide-valve, so as to prevent, when so desired, the backflow of fuel as above described and to obtain an operation where the piston delivers fuel to the injector or injectors during the whole of its stroke, that is to say even after conduit 47 has been cleared by the edge 45. This will correspond to overcharging of the engine.

FIG. 10 shows such a construction.

In this case, conduits 32 and 43 open into the cylindrical housing of slide-valve 13e at levels slightly different from each other and communication between them may be obtained by the combination of a groove 31 with a flat part 49 provided above said groove.

For an angular position such as that illustrated by FIG. 10, it is the solid portion 50 of the slide-valve which, for the low positions of said slide-valve (low speeds of the engine, and in particular starting thereof), comes opposite the inlet of conduit 43, and therefore stops it. In these conditions, there is no communication between conduits 32 and 43 so that there is no return of the fuel through 44, 47. Piston 1 delivers fuel to the injector or injectors for the whole of its stroke. This corresponds to overcharging the engine.

When the slide-valve is rotated about its axis from the above mentioned position, the flat portion 49 is brought opposite the outlet of conduit 43. The whole then works in the manner described with reference to FIG. 9 and piston 1 ceases to deliver fuel as soon as its edge 45 or its inclined surface 48 clears the conduits 44, 47.

Finally, if the slide-valve is provided with speed regulating means (such as constituted by the throttled passage 24' cooperating with conduit 36, 37), when the speed increases, the delivery conduit 3, 5 is placed, through 32 and 49, in communication with the discharge conduit 33 (shown in dotted lines on FIG. 10) in a manner similar to that above described with reference to the preceding figures.

Thus, in a system of the kind of that of FIG. 10, the slide-valve can perform two different functions: obtaining of an overcharging for starting the engine, for a given angular position of the slide-valve, by eliminating the backflow of fuel to the fuel tank during the end part of the upward movement of piston 1, and regulation as a function of the speed by short-circuiting the delivery conduits with the reserve of fuel.

I will now describe, with reference to FIGS. 11 to 16, some other features of my invention.

According to one of these features, the slide-valve is made in such manner as to include at least one inner conduit extending therethrough, and in particular along its axis, which conduit at one end includes a variable section throttled portion (the variations of said section being in particular obtained by varying the angular position of said slide-valve about its axis) and, at the other end, opens into chamber 25 which in turn is connected with the return conduit leading to the reserve of fuel.

Such an arrangement is particularly simple and permits a good operation and a relatively low cost. FIGS. 11 to 14 illustrate an advantageous construction.

In the pump shown by these figures, the main piston 1 cooperates first, through its front edge 51, with the inlet port 6 connected at 7 and 60 with the main feed circuit. Casing 19 contains the reserve of fuel connected with said circuit at $60_1$.

As soon as piston 1 comes to close port 6, there is a discharge of fuel from compression chamber 2 toward the injector or injectors to be fed at this time, in particular through means which will be hereinafter described (that is to say $40_1$, 42 and 4a). It will be noted that anyway, at this time, conduits $32_1$ and 32 leading to the regulating slide-valve are under delivery pressure.

The end of the delivery stroke, for speeds where the regulating slide-valve is not in action, is determined, according to the embodiment that is shown, by the action of an annular groove 46 provided in piston 1, which connects a conduit 44, in communication through $32_1$ with the discharge chamber 2, with a conduit 47 connected with the feed circuit.

It should be noted that this arrangement of two conduits 44 and 47 (FIG. 11) cooperating with a groove such as 46 permits of obtaining during the delivery stroke, opposite said conduits, a double liquidtightness between the delivery and the inlet, which is particularly advantageous when a good liquidtightness is desired.

Concerning now the regulating slide-valve 13f intended to cooperate with conduit 32, it is constituted in this case by a cylindrical element provided in its center with a conduit 20. One end of said conduit leads to the throttle means 21, 21a, 23 which will be hereinafter referred to, and the other end opens freely into chamber 25 connected at 26, $26_1$, 60, $60_1$ with the feed and delivery circuit.

Said slide-valve, as above described, can be moved angularly by means of a rotatable part 30 which acts as a screw driver, the end portion 52 thereof acting at $28_1$ on extensions 28 of the slide-valve.

The throttled portion consists, in this case, in a groove 22 the depth of which varies along its length.

Advantageously, I provide between conduit 20 and groove 22 a throttled portion of calibrated section, for instance constituted by a flat area 21a, connected at 21 with conduit 20.

Anyway, groove 22 cooperates with recess 23 in such manner that the section of flow for the liquid is variable in accordance with the angular position of the slide-valve about its axis, which makes it possible to vary the speed at which regulation is effected. In this case also, regulation is obtained by the action of groove 31, adapted to connect conduit 32 with the discharge conduit 33 (communicating at $33_1$, 60 with the reserve of fuel 19).

It should be noted that a pump of this kind, having a slide-valve operated independently of the fuel delivered from the main cylinder, permits of adopting, for the delivery of fuel from said cylinder toward the injector or injectors, an advantageous feature of the invention, which will now be described.

According to this feature, as illustrated by FIG. 11, and which is especially applicable to a pump intended to feed fuel to the cylinders of a multicylinder engine, fuel is delivered from the chamber 2 of the cylinder, through the main piston 1, which for this purpose is provided with an inner conduit $40_1$ in direct communication with chamber 2 and leading to a side port such as 42, capable of coming successively, during the rotation of piston 1 about its axis, opposite the ports 4a which control the respective delivery conduits 4.

On each of these delivery conduits 4 there may be provided a check valve 5.

According to still another feature of my invention relative to the regulating slide-valve, means are provided to permit of adjusting at will the active stroke of said slide-valve, that is to say in particular, in the embodiment that is illustrated, the movement that it must have in order to place the delivery conduit in short-circuit communication with the reserve of liquid.

Such means are shown on FIG. 15 where it has been supposed that conduits 32 and 33 are offset and cooperate with a groove of a sufficient height so that, at least for the angular position that is shown, the slide-valve 13g must move a height h in order to short-circuit the delivery conduit with the reserve of liquid.

It is known that the coefficient of irregularity of the regulating slide-valve depends upon this height h. This coefficient of irregularity is the ratio $$K = \frac{N_2 - N_1}{\frac{N_1 + N_2}{2}}$$

where $N_1$ is the lowest speed at which the regulating slide-valve starts reducing the rate of flow, and $N_2$ the upper limit above which said slide-valve wholly stops the delivery, $N_2$ being relatively little different from $N_1$.

It is of interest to increase this coefficient of irregularity, that is to say height h, under some running conditions, in particular at low speeds (idling), in order to increase stability, where as it is advantageous to reduce this coefficient, that is to say height h, for higher speeds.

This possibility of variations is obtained by providing the slide-valve with a side recess 63 acting at least for some angular positions of the slide-valve and possibly in an adjustable fashion according to said angular position, said recess being for instance limited by an oblique line 64 adapted to cooperate with the outlet of conduit 33. It will be understood that, according to the angular position of the slide-valve and due to the existence of this inclined surface 64, height h may vary.

Such an arrangement might apply of course to regulating slide-valves of any other type having a throttled portion either variable or not.

According to still another feature (FIGS. 15 and 16), slide-valve 13g is made to bear, in its position of rest on the pump body, no longer through its upper head portion 28 as was the case in the above described embodiments, but through its base 65 which bears directly upon the body of the pump, for instance upon the cross member 66.

The construction of the pump is made simpler. The space occupied by cage 52 can be reduced due to the elimination of head 28. The drive in rotation is obtained through a fork 67.

According to still another feature (FIGS. 15 and 16) concerning the auxiliary pump 15, 16, the piston 15 of this pump may be made such that it does not leave the cooperating housing 16, liquidtightness being obtained through a joint 68.

In this case, no special feed is to be provided for this pump 15, 16 which is fed through slide-valve 13g, after every piston stroke. In this case also, a great simplification is obtained. Conduit $60_1$ can be done away with, the fuel feed pump, if it is located on the outside, being for instance connected at 69.

According to another feature of my invention, the whole of the feed and discharge circuits is fed under pressure.

Owing to the fact that a suitable feed pressure (for instance two kilograms or more) exists in conduits and chambers $26_1$, $33_1$, 7, the cylinder 16 of the auxiliary pump and the corresponding conduits 17, 23, etc., are correctly filled through slide-valve 13 after every piston stroke. I thus obtain a very reliable operation of the regulating circuits. On the other hand, this filling under pressure also contributes in improving the filling of the main cylinder, thus ensuring a better injection.

Advantageously, this feed pressure will be made adjustable at will, for instance by means of a discharge valve 70 the spring 71 of which will be given the desired force.

FIGS. 17 to 20 relate to an arrangement where there is provided, in a pump of the type above described, a metering slide-valve capable, upon being actuated by the action of a liquid circulating through a control circuit distinct and separate from the delivery circuit, of controlling the action of piston 1, preferably in an adjustable fashion, so as to modify at will the length of the delivery stroke of said piston.

A slide-valve of this type, illustrated at 130 on FIGS. 17 to 20, is inserted for instance in a conduit 72 leading from feed chamber 19 to at least one port $72_0$ cooperating with the main piston 1, said slide-valve 130 being capable of ensuring at the desired times, by its displacements which are hydraulically controlled by those of the main piston, first the feed of fuel to delivery chamber 2, then, the stopping of said feed, which causes liquid to be forced by piston 1 into conduits 4, and finally the short-circuiting of said chamber 2, which corresponds to the end of said delivery.

In order to permit of modifying at will, by means of such a slide-valve, the delivery stroke of the piston and consequently the amount of fuel driven on every piston stroke, this slide-valve is provided with distributing means cooperating for instance with ports 73 of said conduit 72, adapted to permit of modifying at will the times at which said conduit is closed and/or opened. This system thus permits of modifying: either the beginning of the delivery of the main piston, or the end of this delivery, or both.

Advantageously, this adjustment is provided by giving slide-valve 130 the possibility of an angular adjustment about its axis and by constituting the above mentioned distributing means by oblique surfaces.

According to the embodiment shown by the drawings, slide-valve 130 is mounted in a housing 140 provided in pump body c and it is hydraulically operated by a piston 150 integral with piston 1 and cooperating with a cylindrical housing 160 connected with cylinder chamber 140 through a conduit 170 forming the above mentioned control circuit.

This slide-valve 130 includes for instance, laterally: on the one hand a groove 74 capable of cooperating with ports 73 for the inlet of fuel to the main piston (fuel coming from feed chamber 19 and passing through conduit 72), and on the other hand, side grooves having an oblique or helical profile 75 connected together at 76 and adapted to cooperate also with said ports 73 so as to short-circuit the delivery circuit through conduit 72, and thus to end the delivery stroke.

It will be seen that the end of the delivery period takes place at a time which is variable at will according to the angular position of the metering slide valve, owing to the provision of oblique grooves 75.

This angular adjustment of slide-valve 130 is performed by means of parts 300, 520, 270 analogous to the corresponding parts 30, 52, 27 already described concerning slide-valve 13.

On the side of the main piston 1, conduit 72 leads, through ports $72_0$, to a groove 77 of said piston, connected with the delivery chamber of the cylinder through a passage provided in the end part of said piston, in particular through a side passage 78, which may also serve to distribute fuel to the respective cylinders, as it will be hereinafter explained.

This system works as follows:

In the position illustrated by FIG. 17, liquid penetrates into delivery chamber 2 through conduit 72 and groove 74, then, as piston 1 starts moving toward the left, the metering slide-valve 130 is itself displaced through the action of piston 150 until the solid portion of the slide-valve comes opposite ports 73 and delivery of fuel by the main piston 1 then starts (FIG. 18), finally, this delivery goes on until the time (variable in accordance with the angular position of slide-valve 130 about its axis) where grooves 75 come opposite ports 73 and enable the liquid to flow back (FIG. 19).

The operation is improved if there is provided, as above stated, a substantial pressure inside feed chamber 19.

Such a system is particularly advantageous in the case of a pump for feeding several injectors 4 leading to the respective cylinders of a multicylinder engine, that is to say in the case of a pump the piston 1 of which moves both with a reciprocating and with a rotating movement. The whole system is driven from a shaft 79 through a suitable mechanism 80 (diagrammatically shown in the drawings) for imparting the desired reciprocating movement to piston 1, because in this case said system is entirely independent of the movement of rotation of the main shaft, which permits of arranging the metering slide valve in any desired fashion and to make it capable of performing any desired supplementary function.

For instance, this slide-valve might be provided with means to obtain overcharging when the engine is to be started by eliminating backflow of the liquid.

I might also provide an adjustable leak in the circuit leading from differential piston 150 to slide-valve 130.

I may also provide, on the metering slide-valve or on the whole of said slide-valve 130 and piston 150, means for achieving a lead (or a lag) adjustable automatically in accordance with the speed.

For this purpose for instance, as shown by the drawings, I provide in piston 150 a small notch 81 capable of ensuring an adjustable leak at the time said piston engages into the corresponding cylindrical recess 160. This notch being small permits of obtaining a leak which is more important at low speeds, whereas it tends to disappear at high speeds. Therefore, when piston 1 is delivering fuel toward the injector, there is an automatic lead as a function of the speed.

It should be understood that the metering slide-valve such as 130 might be placed under control of a governor or other external element in order to regulate the amount of fuel displaced on every piston stroke in the chamber 2 of the cylinder, in accordance with any desired parameter (air flow rate, rotational speed, temperature, etc.).

The invention also includes a feature according to which the slide-valve, in this case the metering slide-valve 130, and the speed regulation slide-valve $13h$, are disposed transversely to the axis of the main piston 1, which permits a very compact construction.

Distribution of fuel toward the respective injectors is obtained at the front of piston 1, for instance by means of side groove 78 cooperating with ports 82 leading to check valves 5 and to the injector connections 4, whereas the two metering and speed regulation functions are performed slightly behind the front portion of the piston, opposite groove 77, as shown on the drawing (FIG. 17).

It should be noted that this arrangement permits of easily connecting with feed chamber 19 the respective conduits cooperating with the slide-valves (conduits 33, 72, and so on).

I have shown at 83, 84, merely by way of indication, racks for imparting the desired rotary displacements to slide-valves 13 and 130, said racks being operable from a distance by the throttle pedal or a lever or mechanical governor, and so on.

Of course, the devices shown on any of the above described figures may be mounted on the pumps shown on other figures, or combined with features shown on these other figures.

It should be well understood that, concerning the metering slide-valve, the invention covers in a general manner any slide-valve actuated independently of the main delivery circuit and capable of ensuring the liquid inflow, delivery and back flow to and from the main cylinder, even when this slide-valve is not arranged to permit an adjustment of the delivery stroke of the piston. Therefore, it also covers the case of a slide-valve which has no angular displacement about its axis and does not carry helical surfaces.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A liquid feed pump which comprises, in combination, a pump body forming a cylinder, one end of said cylinder constituting a delivery chamber, a reciprocating piston slidable in said cylinder, a delivery circuit connected with said delivery chamber, means forming a feed chamber containing the liquid to be pumped, said feed chamber adjoining said cylinder, means operatively connected with said piston and said cylinder for placing said feed chamber in communication with said delivery chamber for given positions of said piston in said cylinder, said pump body being provided with a discharge conduit starting from said delivery chamber and with a cylindrical housing intersecting said conduit, a slide-valve mounted movably in said housing to cooperate with said discharge conduit, said slide-valve being arranged, for one position thereof with respect to said pump body, to close said discharge conduit and, for another position, to clear said discharge conduit, resilient means interposed between said pump body and said slide-valve for urging said slide-valve toward its discharge conduit closing position, means forming a regulating liquid circuit entirely distinct and separate from said delivery chamber and said delivery circuit and extending through said pump body, said regulating circuit having a portion thereof arranged to form, with a portion of said slide-valve, a variable volume chamber disposed so that an increase of volume thereof produces a displacement of said slide-valve toward its discharge conduit opening position, and means operatively connected with said piston for periodically forcing liquid through said regulating circuit toward said variable volume chamber in synchronism with the delivery strokes of said piston, said regulating circuit including a throttled passage downstream of the portion thereof forming said variable volume chamber, whereby, on every delivery stroke of said piston, there is obtained a pressure drop past said throttled passage producing a displacement of said slide-valve toward its discharge conduit opening position, said displacement being of an amplitude that increases as the speed of displacement of said piston increases.

2. A pump according to claim 1, in which said slide-valve is adjustable by rotation in said housing about its axis, said throttled passage being formed in said slide valve so that its dimension is varied in accordance with the angular position of said slide-valve about said last mentioned axis, and means for adjusting the position of said slide-valve about said last mentioned axis.

3. A pump according to claim 2, in which said slide-valve is provided with a longitudinal passage arranged to keep said discharge conduit constantly opened when said slide-valve is in a given angular position about its axis.

4. A pump according to claim 1, in which said variable volume chamber has its fixed walls constituted by surfaces of said pump body located about one end of said slide-valve at the corresponding end of said housing, said regulating circuit including a conduit extending longitudinally through said slide-valve from said end thereof, and said throttled portion of said regulating circuit being formed between cooperating edges of said slide valve and said surfaces respectively.

5. A pump according to claim 1 in which said variable volume chamber has its fixed walls constituted by surfaces of said pump body located about one end of said slide-valve at the corresponding end of said housing, the portion of said regulating circuit downstream of said variable volume chamber being constituted by a conduit provided in said pump body opening into said housing opposite the other end of said slide-valve, said last mentioned end of said slide-valve being provided with a longitudinal passage opposite the opening of said last mentioned conduit, to form therewith said throttled portion of said regulating circuit.

6. A pump according to claim 1, in which said variable volume chamber has its fixed walls constituted by surfaces of said pump body located about one end of said slide-valve at the corresponding end of said housing, said pump body being provided with at least one conduit starting from said housing at an intermediate point thereof, said conduit forming a portion of said regulating circuit, said slide-valve being provided with at least one side recess to connect said variable volume chamber with said last mentioned conduit, to constitute the portion of said regulating circuit downstream of said last mentioned chamber, and said throttled portion of said regulating circuit being formed between cooperating edges of said housing and said recess.

7. A liquid feed pump which comprises, in combination, a pump body forming a cylinder, one end of said cylinder constituting a delivery chamber, a reciprocating piston slidable in said cylinder, a delivery circuit connected with said delivery chamber, means forming a feed chamber containing the liquid to be pumped, said feed chamber adjoining said cylinder, a conduit extending from said feed chamber and opening into the side wall of said delivery chamber so as to be closed by said piston at the beginning of the delivery stroke of said piston, said piston being provided with a passage extending transversely therethrough, conduit means extending from said feed chamber and opening into the wall of said cylinder at a point thereof located so as to register with said passage for one position of said piston corresponding to the end of its delivery action, said pump body being provided with a discharge conduit starting from said delivery chamber and with a cylindrical housing intersecting said conduit, a slide-valve mounted movably in said housing to cooperate with said discharge conduit, said slide-valve being arranged, for one position thereof with respect to said pump body, to close said discharge conduit and, for another position, to clear said discharge conduit, resilient means interposed between said pump body and said slide-valve for urging said slide-valve toward its discharge conduit closing position, means forming a regulating liquid circuit entirely distinct and separate from said delivery chamber and said delivery circuit and extending through said pump body, said regulating circuit having a portion thereof arranged to form, with a portion of said slide-valve, a variable volume chamber disposed so that an increase of volume thereof produces a displacement of said slide-valve toward its discharge conduit opening position, and means operatively connected with said piston for periodically forcing liquid through said regulating circuit toward said variable volume chamber in synchronism with the delivery strokes of said piston, said regulating circuit including a throttled portion downstream of the portion thereof forming said variable volume chamber, whereby, on every delivery stroke of said piston, there is produced a displacement of said slide-valve toward its discharge conduit opening position, said displacement being of an amplitude that increases as the speed of displacement of said piston increases, said pump body and said slide-valve being provided with conduit means capable of connecting said delivery circuit with said passage in said piston for said position thereof.

8. A pump according to claim 7 in which said slide-valve is adjustable by rotation about its axis, said slide-valve being arranged, for one angular position thereof, to stop said last mentioned conduit means whereby the delivery of the pump lasts until the end of the delivery stroke of said piston.

9. A pump according to claim 1 including a plurality of delivery circuits starting laterally from said cylinder, said piston being provided with a longitudinal lateral groove capable of connecting said delivery chamber successively with said respective delivery circuits and means for effecting rotation of said piston about its axis to place said longitudinal lateral groove in communication with said delivery circuits respectively.

10. A liquid feed pump which comprises, in combination, a pump body forming a cylinder, one end of said cylinder constituting a delivery chamber, a reciprocating piston slidable in said cylinder, a delivery circuit connected with said delivery chamber, means forming a feed chamber containing the liquid to be pumped, said feed chamber adjoining said cylinder, said pump body being provided with a feed conduit extending in the same direction as said cylinder and one of the ends of which opens into said delivery chamber whereas its other end opens into said feed chamber, said pump body being provided with a cylindrical housing transverse to said cylinder and which intersects said conduit, a slide-valve mounted reciprocably in said housing to cooperate with said conduit for controlling the flow of liquid therethrough, resilient means interposed between said pump body and said slide-valve for urging said slide-valve toward a given position thereof, means forming a control liquid circuit entirely distinct and separate from said delivery chamber and said delivery circuit and extending through said pump body, said control circuit having a portion thereof arranged to form, with a portion of said slide-valve a variable volume chamber disposed so that an increase of volume thereof produces a displacement of said slide-valve away from said above mentioned position thereof, means operatively connected with said piston for periodically forcing liquid through said control circuit toward said variable volume chamber in synchronism with the delivery strokes of said piston to operate said slide-valve, said pump body being provided with a discharge conduit starting from said delivery chamber and with a cylindrical housing intersecting said discharge conduit and in line with said first mentioned housing on the other side of said cylinder from said first mentioned housing, a slide-valve mounted movably in said second mentioned housing to cooperate with said discharge conduit, said second mentioned slide-valve being arranged, for one position thereof with respect to said pump body, to close said discharge conduit and, for another position, to clear said discharge conduit, resilient means interposed between said pump body and said second mentioned slide-valve for urging said second mentioned slide-valve toward its discharge conduit closing position, means forming a regulating liquid circuit entirely distinct and separate from said delivery chamber and said delivery circuit and extending through said pump body, said regulating circuit having a portion thereof arranged to form, with a portion of said second mentioned slide-valve, a variable volume chamber disposed so that an increase of volume thereof produces a displacement of said second mentioned slide-valve toward its discharge conduit opening position, and means operatively connected with said piston for periodically forcing liquid through said regulating circuit toward said second mentioned variable volume chamber in synchronism with the delivery strokes of said piston, said regulating circuit including a throttled portion downstream of the portion thereof forming said second mentioned variable volume chamber, whereby, on every delivery stroke of said piston, there is produced a displacement of said second mentioned slide-valve toward its discharge conduit opening position, said displacement being of an amplitude that increases as the speed of displacement of said piston increases.

11. A pump according to claim 10 in which each of said two means operatively connected with said piston includes a differential piston element rigid with said piston and a cooperating cylinder element carried by said pump body inside said feed chamber.

12. A pump according to claim 10 in which said piston also has a rotation movement including a plurality of delivery circuits starting laterally from said delivery chamber, said piston being provided in its end part with a longitudinal groove capable of cooperating successsively with said respective delivery circuits, said feed conduit and said discharge conduit opening into the cylindrical wall of said delivery chamber near the rear end thereof, said piston being provided with an annular groove in communication with said longitudinal groove and adapted to cooperate with the ends of said two last mentioned conduits opening into said delivery chamber.

13. A pump according to claim 1 in which said slide-valve is provided with a groove in its side wall to clear said discharge conduit by forming a communication between the two openings of said discharge conduit in said cylindrical housing, said groove having an oblique edge to cooperate with one of said openings, said slide-valve being adjustable angularly in said housing by rotation about its axis to permit of varying the longitudinal position of said slide-valve for which said oblique edge clears said last mentioned opening, whereby the portion of the stroke of said slide-valve for which it clears said discharge conduit can be varied.

14. A pump according to claim 1 in which said variable volume chamber has its fixed walls constituted by surfaces of said pump body located about one end of said slide-valve at the corresponding end of said housing, the movable end of said variable volume chamber consisting of the end face of said slide-valve at said end thereof, said slide-valve being rotatable in said housing about its axis and said throttled passage being formed in said slide valve so that its dimension is varied according to the angular position of said slide-valve about said last mentioned axis, said throttled passage being closed for at least one of said angular positions, said pump further including a safety discharge conduit for the regulation circuit liquid, said last mentioned discharge conduit opening into said housing at one point thereof adapted to be cleared by said last mentioned end of said slide-valve when said slide-valve is in said angular position for which said throttled passage is closed and is pushed longitudinally by the regulation circuit liquid then prevented from flowing out through said throttled passage.

References Cited in the file of this patent

UNITED STATES PATENTS

| | | |
|---|---|---|
| 2,420,431 | Kalitinsky | May 13, 1947 |
| 2,445,266 | High | July 13, 1948 |
| 2,582,535 | Drouot | Jan. 15, 1952 |
| 2,731,917 | Evans | Jan. 24, 1956 |

FOREIGN PATENTS

| | | |
|---|---|---|
| 901,120 | Germany | Jan. 7, 1954 |
| 936,123 | Germany | Dec. 22, 1955 |